Inventor
James E. Bevins
By S. H. Hartz
Attorney

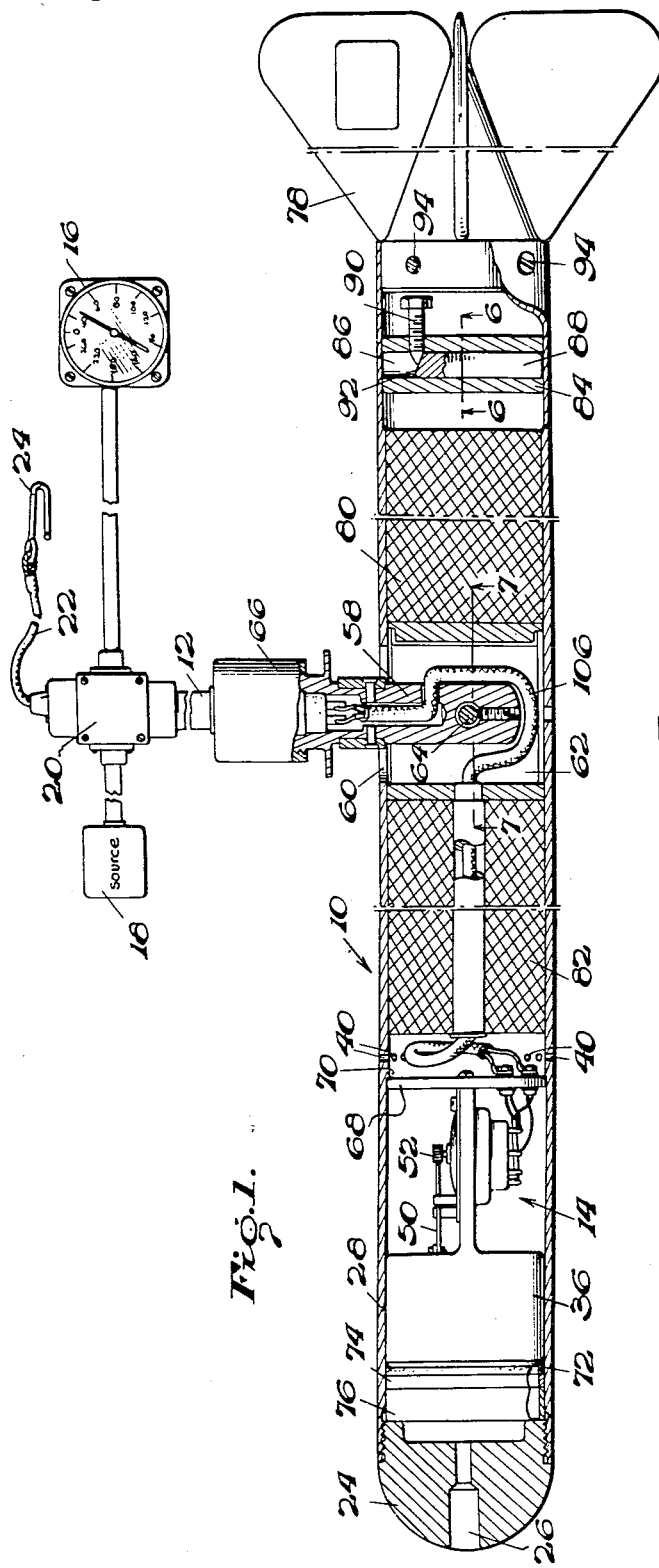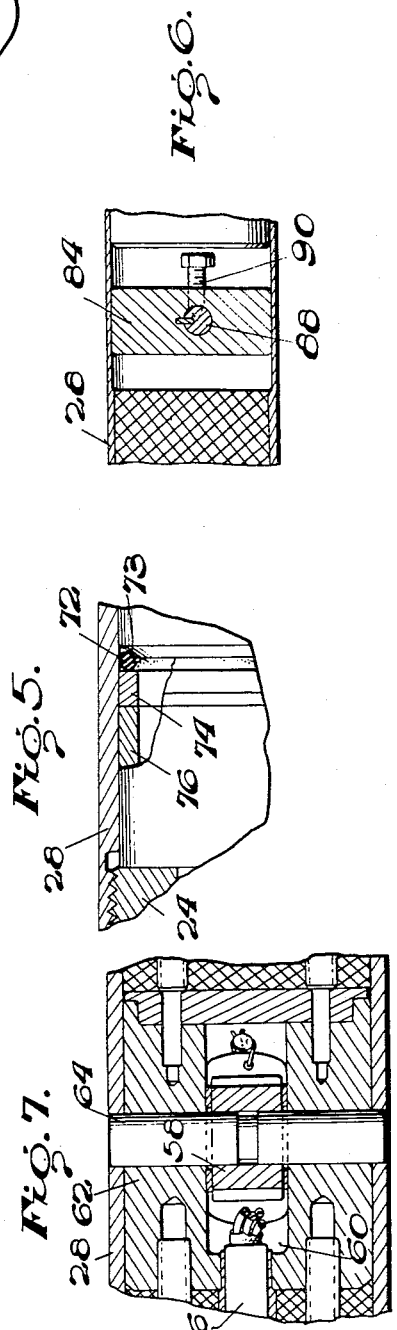
May 22, 1956  J. E. BEVINS  2,746,294
FLUID PRESSURE RESPONSIVE MEASURING APPARATUS
Original Filed April 7, 1945  3 Sheets-Sheet 1
INVENTOR.
James E. Bevins.
BY
ATTORNEY May 22, 1956 J. E. BEVINS 2,746,294
FLUID PRESSURE RESPONSIVE MEASURING APPARATUS
Original Filed April 7, 1945 3 Sheets-Sheet 2
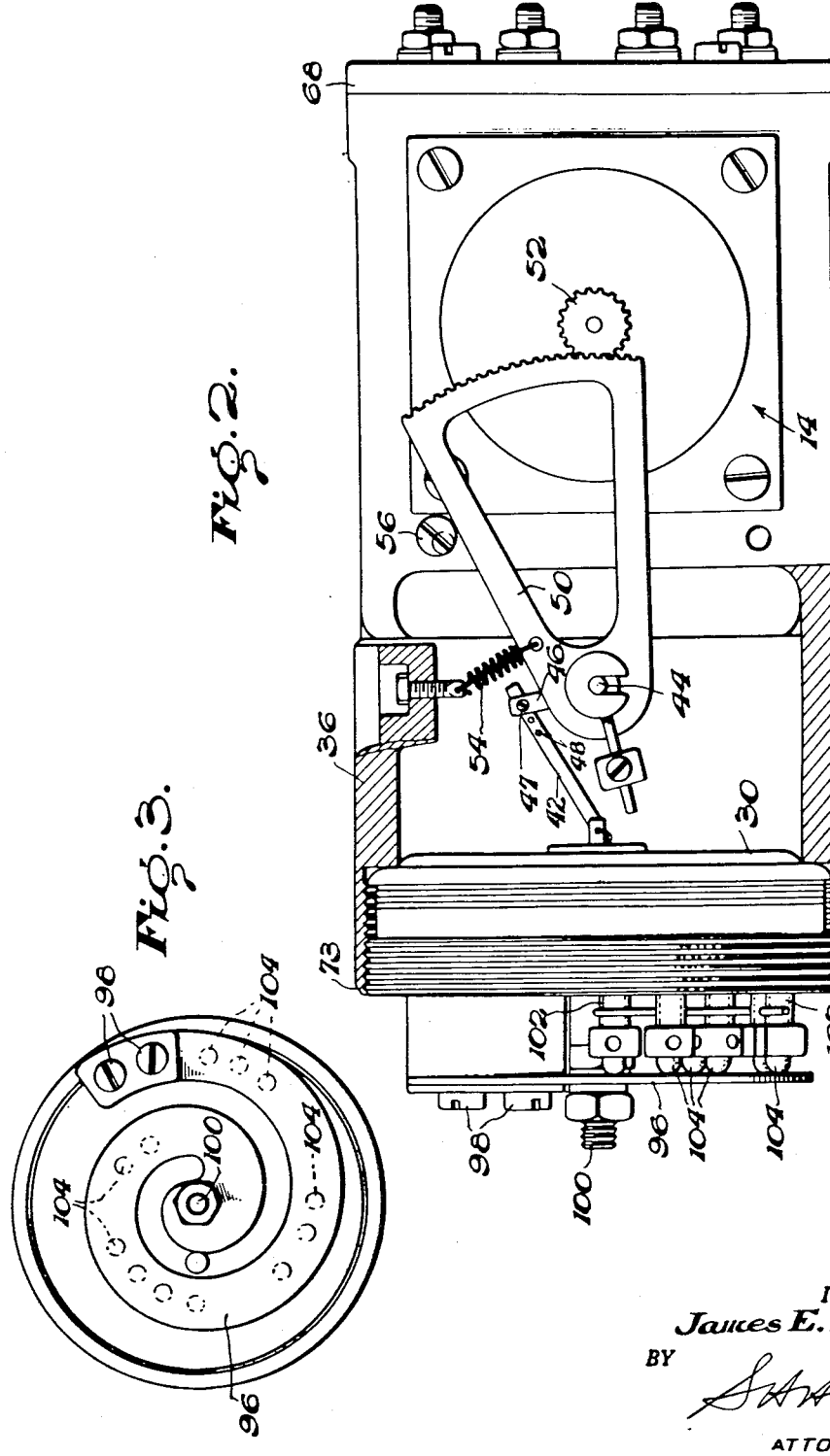
INVENTOR.
James E. Bevins.
BY
S. H. Hartz
ATTORNEY May 22, 1956 J. E. BEVINS 2,746,294
FLUID PRESSURE RESPONSIVE MEASURING APPARATUS
Original Filed April 7, 1945 3 Sheets-Sheet 3

United States Patent Office 2,746,294
Patented May 22, 1956

2,746,294

FLUID PRESSURE RESPONSIVE MEASURING APPARATUS

James E. Bevins, Ramsey, N. J., assignor to Bendix Aviation Corporation, Teterboro, N. J., a corporation of Delaware Original application April 7, 1945, Serial No. 587,033, now Patent No. 2,623,383, dated December 30, 1952. Divided and this application April 30, 1952, Serial No. 285,178

1 Claim. (Cl. 73—397)

This invention relates to devices for the accurate measurement of air speed and more particularly to a novel type of air speed instrument which is electrically operated and especially adapted for use on aircraft for the purpose of quickly and accurately calibrating the usual air speed indicator of the craft. This application constitutes a division of copending application Serial No. 587,033 filed April 7, 1945 by James E. Bevins, which application is now U. S. Patent No. 2,623,383 granted December 30, 1952.

In the operation of aircraft, extreme accuracy in the measurement of the airspeed of the craft is highly essential, in order that the pilot may more readily plot his course and ascertain his position at any time. Especially is this true when several aircraft are flying in formation at night or under conditions of poor visibility. Under these latter circumstances it is obvious that more precise formation flying may be had if the air speed indicators of all the craft are similarly calibrated and all readings follow the same curve.

The present invention accordingly has for one of its objects the provision of a master air speed indicator which may be readily employed as a test device so that the air speed indications thereof may be used to calibrate the usual air speed indicator of the aircraft.

Another object of the present invention is to provide a master air speed indicator capable of ready use on different aircraft, so that the air speed measuring devices of all the aircraft may be quickly calibrated in accordance with the readings obtained from the master indicator.

Still another object is to provide a master indicator of the above type which embodies a novel construction permitting the same to be readily suspended from the craft for the purpose of air speed determination, the arrangement being electrically operable in order that the indications may be observed upon an instrument positioned within the craft.

A further object comprehends an electrically operated Pitot tube which is suspended in the airstream below the craft to automatically align itself with the true flight path of the craft, together with a novel construction whereby the speed of the Pitot tube, and hence the speed of the craft, may be readily observed within the latter.

Still another object resides in providing a novel construction of the foregoing character including an arrangement permitting the balance of the trailing Pitot tube about its axis of suspension to be easily and quickly adjusted, so that the tube will seek automatic alignment in the airstream during flight.

A still further object includes a novel and compact arrangement of parts including the provision of a highly desirable and effective calibrating mechanism for the dynamically operated diaphragm of the Pitot tube, the arrangement being such that extreme accuracy of calibration may be secured.

Another object is to provide an electrically operated master Pitot tube characterized by a novel arrangement of parts whereby the unit may be quickly associated with different aircraft to enable rapid and accurate calibrations of the air speed indicators thereof.

Other objects and novel features of the invention will appear more fully hereinafter from the following detailed description when taken in connection with the accompanying drawings wherein one form of the invention is illustrated. It is to be expressly understood, however, that the drawings are utilized for purposes of illustration only and are not designed as a definition of the limits of the invention, reference being had for this purpose to the appended claim.

Referring more particularly to the drawings wherein similar reference characters refer to similar parts throughout the several views;

Figure 1 is a side view partly in section of an electrically operated Pitot tube mechanism for the indication of air speed and constructed in accordance with the principles of the present invention;

Figure 2 is an enlarged view partly in section of the transmitter unit and operating parts associated therewith;

Figure 3 is an end view of the transmitter unit showing the calibrating spring which is associated with the diaphragm;

Figure 5 is an enlarged detail showing the manner of sealing the transmitter unit in the Pitot tube casing;

Figure 6 is a sectional view taken along lines 6—6 of Figure 1; and

Figure 7 is a fragmentary view in section taken along lines 7—7 of Figure 1.

Figure 4:
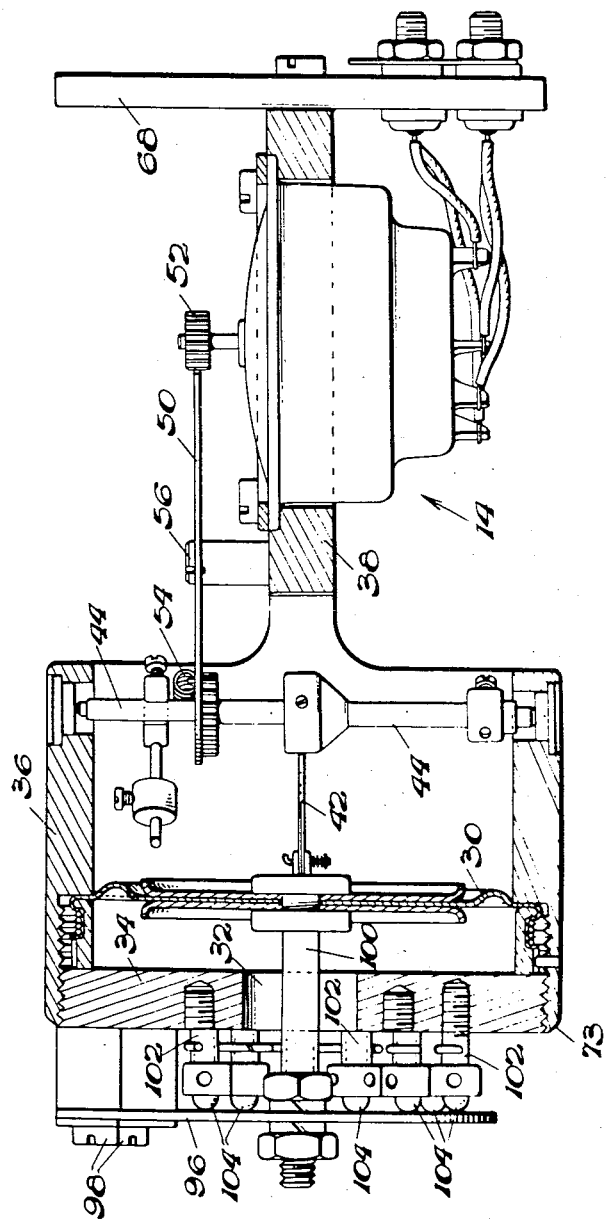
Figure 4 is a view similar to Figure 2 but taken at right angles to the latter and illustrating the cooperation between the diaphragm and transmitter.

Referring more particularly to Figure 1, the present invention is illustrated therein as comprising a Pitot tube 10 having a streamlined contour and adapted to be suspended from the aircraft as by means of the combined cable and electrical conduit 12. The Pitot tube 10 is provided in its forward portion with a suitable type of self-synchronous telemetric transmitter 14 arranged to respond to variations in air speed, a self-synchronous telemetric receiver 16 being located within the craft for observing the air speed of the Pitot tube and hence the airplane. A suitable source of electrical energy 18, within the craft, may be readily and detachably connected with the self-synchronous telemetric system through the T-connection 20, and the entire assembly may be anchored to the craft by the steel cable 22 and hook 24.

In order that the Pitot tube 10 may respond to the variable air pressure during flight, for the purpose of measuring the air speed, the forward portion, or nose 24 is provided with a centrally disposed opening 26 for conveying dynamic pressure into casing 28 where it is conducted to the left side of a diaphragm 30 (Figure 4) through an opening 32 in a cap 34. Cap 34 securely clamps the diaphragm 30 to a cylindrical support 36 which extends rearwardly and constitutes a rigid and stable mounting 38 for the transmitter 14, the support 36 and mounting 38 thus providing a unitary structural component which may readily be assembled within the casing 28. When these parts are in the position shown in Figure 1, static pressure is conducted into the casing 28, through a series of openings 40 in the wall of the casing (Figure 1), and such pressure is exerted on the right side of the diaphragm 30. Thus the latter is subjected on opposite sides to the dynamic and static pressures of the air, and as well understood in the art, the resultant movements of the diaphragm may be utilized for the purpose of measuring the air speed of the Pitot tube and hence the air speed of the plane from which it is suspended.

Means are provided for interconnecting the diaphragm 30 and the transmitter 14, and in the form of the invention illustrated, such means is constituted by an arm 42, Figures 2 and 4, pivotally secured at one end to the central portion of the diphragm 30, and at the other end to an oscillatable shaft 44 through a lever 46. Preferably, lever 46 may be adjusted with respect to arm 42 by means of a pin or screw 47 which may be inserted in one of a plurality of openings 48 in the arm 42, this construction enabling adjusting movement of the shaft 44 relative to the diaphragm 30 to be effected. A gear segment 50, in constant meshing engagement with a pinion 52 of the rotor of the transmitter 14, is secured to the shaft 44, and is normally urged to the position shown in Figure 2 by a spring 54 anchored to the support 36. If desired, a further adjustment for the shaft 44 and gear segment 50 may be provided by the cam screw 56, which when rotated may vary the initial position of the gear segment 50 and hence the rotor of the transmitter 14.

A novel arrangement is provided by the present invention for supporting the Pitot tube 10 at its center of gravity to enable slight pivotal movement thereof to facilitate alignment of the tube in the flight path. As shown, such means include a supporting block 58 positioned within a recess 60 formed in a member 62, a pin 64 being inserted through the block and through suitable openings in the wall of the casing 28, see Figures 1 and 7. Preferably, the ends of the pin 64 are secured to the casing 28 and the block 58 pivotally moves about the axis of the pin. However, it will be understood that the block may be secured to the pin, if desired, in which event the ends of the latter are mounted to pivot in the walls of the casing 28. It is pointed out that the block 58 also constitutes a portion of the combined electrical and strain coupling 66 which contains suitable complementary pin type coupling members to connect cable 106 with the source 18 and indicator receiver 16. With such an arrangement it will be readily perceived that the entire Pitot tube 10 is pivotally supported at its center of gravity through the block 58 and pin 64, so that the tube may readily balance and adjust itself in the proper flight path during operation.

In assembling the transmitter unit 14 within the casing 28 of the Pitot tube, a novel construction is employed for securely maintaining the unit in position against lateral and longitudinal displacements and for effectively sealing the dynamic section of the unit from the static section thereof. In the form illustrated, the transmitter unit 14 is provided with a support 68 which bears against a shoulder 70 of the casing 10, as the unit is moved inwardly through the open forward portion of the tube. Thereafter, a deformable sealing ring 72, which may be formed of rubber, is placed in engagement with a beveled forward face 73 of the unit 14, and the nose 24 is assembled on the threaded open end of the tube, a pair of collars 74, 76 being interposed between the nose 24 and the sealing ring 72, for expanding the ring against the inner wall of the casing 28 and for forcing the unit 14 inwardly against the shoulder 70. Thus, the transmitter unit may be readily assembled in the forward portion of the Pitot tube, and secured therein against lateral and longitudinal displacements, it being pointed out that the support 36 snugly fits within the interior of the casing 28 and that the sealing ring forms a relatively simple but effective seal between the dynamic and static sections of the unit on opposite sides of the diaphragm 30.

In order that the Pitot tube may maintain a straight line flight path during flight, the rear portion thereof is provided with a suitable tail-piece 78. It is also pointed out that the casing 28 is provided on opposite sides of the member 62, with sections 80 and 82 of a suitable metal alloy in order to seal the tube on either side of its pivotal support and provide proper weight distribution for efficient operation. A further important feature in this respect includes a novel balancing means for securing accurate balance of the tube 10, after assembly, and at any subsequent period when the tube is not precisely balanced about the pin 64. As shown, such means comprises a metallic block 84 located at the rear portion of the tube and provided with a bore 86 for receiving a locking pin 88 which is prevented from turning within the bore by virtue of a conventional key provided within the bore and engaging the pin. An adjustment screw 90, threadedly received by the block 84 is adapted to engage the beveled top 92 of the pin 88, this construction providing a wedge and enabling the opposite end of the pin to be forced into tight frictional engagement with the inner wall of the casing to secure the block in any desired position of adjustment. Thus, if balancing of the tube is required, it is only necessary to loosen the screw 90, move the block 84 to the proper position to secure balance, and tighten the screw to lock the block in the new position. Since the tail-piece 78 is readily removable from the tube by the use of fastening screws 94, it will be seen that the aforementioned adjustment may be quickly effected.

A further important feature of the invention includes the provision of a novel means for calibrating the diaphragm 30, in order to accurately position the same initially and in order also to secure accurate response thereof to different air speeds over a wide range. As shown, such means comprises a flat-spiral spring 96 made of relatively thin spring metal arranged with its width normal to the axis of the spiral, one end of the spring being secured, as by means of screws 98, to the cap 34, while the opposite end is secured to the center of the diaphragm 30 through a rod 100, Figures 2, 3 and 4. Positioned between the spring 96 and the cap 34 are a plurality of studs 102 which are threadedly received in the cap 34, and provided with rounded heads 104 which may be selectively engaged with the spring to urge the latter away from the cap to variably tension the diaphragm as the studs are adjusted. With this construction, and as will be readily observed from Fig. 3, adjustment of the studs will serve to vary the effective length of the spring 96 and hence its deflection rate, in its action in tensioning or calibrating the diaphragm 30 throughout its entire range of operation. If desired, suitable wires may be associated with the studs 102 in order to secure them in their adjusted position.

As heretofore stated, the transmitter and receiver units 14 and 16 may be of any suitable electrically operated self-synchronous telemetric type wherein motion of the transmitter is synchronously reproduced at the receiver. A convenient system of this character which may be utilized in the present invention is that disclosed in the patent to Paul F. Bechberger, No. 2,342,637, dated February 29, 1944. The arrangement shown in this patent is especially desirable since it does not involve the use of contact brushes which would tend to introduce frictional loads and resultant errors in the electrical transmission of the relatively small torques involved in an instrument such as an air speed indicator. However, it will be understood that other types of synchronous telemetric systems may be employed if desired, the primary requirement being that the receiver 16 reproduce at a remote point, the motion of the diaphragm 30. In the present invention, the transmitter unit 14 is provided with the required electrical connections, as well understood, and these connections form a cable 106 which is passed beneath the block 58, Figure 1, and proceeds to the coupling 66 from whence it is associated with the source 18 and indicator 16.

In operation, it is assumed that the Pitot tube 10 has been properly balanced and calibrated and it is desired to employ the instrument to calibrate the usual air speed indicators on one or more aircraft. Hook 24 is then anchored to the craft, and source 18 and indicator 16 are connected through detachable connections with the T coupling 20. With the craft in flight, the Pitot tube is then allowed to descend beneath the plane and be suspended therefrom through the cable 12, it being pointed out that the latter is of sufficient length so that the tube is free of any air disturbances caused by flight of the craft. The tube will thereupon assume the proper flight path attitude as it is towed by the craft and the transmitter 14 will respond to variations in movement of diaphragm 30, the latter being influenced by the differential of dynamic and static pressures acting thereon. All motion of the transmitter 14 will be conveyed to the receiver 16, as heretofore described, and the readings of the latter, at different air speeds, are employed for calibrating the craft's air speed indicator.

Once the air speed indicator on a particular craft has been calibrated, it is only necessary to repeat the process on the other craft, using the present invention as the master calibrating unit. Thus, all air speed indicators of all the aircraft of the squadron or fleet will have identical readings under similar air speed conditions and proper formation flying will be more readily obtainable, especially under conditions of poor visibility.

The present invention thus affords a simple and effective means for calibrating the air speed indicators of one or more aircraft and includes a novel structure which, while relatively simple in construction, is exceedingly accurate and reliable in operation.

While a preferred embodiment of the invention has been disclosed herein, and described with considerable particularity, it will be understood by those skilled in the art that the same is not limited thereto but may receive a variety of expressions without departing from the spirit of the invention. Reference will therefore be had to the appended claim for a definition of the limits of the invention.

I claim:

Measuring apparatus comprising a housing having a generally cylindrical portion, fluid pressure responsive flexible means including an element in the housing which is movable along the axis of said cylindrical portion in response to variations in fluid pressure, means for measuring movements of said element along said axis in response to variations in fluid pressure including a support structure supported in the housing by the housing and extending transversely therefrom substantially normal to said axis, electrical transmitter means disposed in the housing and having a part movable with said movable element for developing an electrical signal which is a function of the displacement of said movable element along said axis, a flat ribbon-like spiral spring disposed in the housing for restraining movement of said element along said axis, said spring having its ribbon widths normally lying substantially in a common plane which is normal to said axis and which is spaced from a portion of said support structure, said spring having its outer end fixedly mounted with respect to the housing and having its inner end disposed substantially at said axis, a member extending along said axis and connecting the inner end of said spring with said movable element so that said element deflects said spring toward said support structure upon movement of said movable element along said axis in response to variations in fluid pressure, and a series of abutment members mounted on said portion of the support structure along a spiral path in register with the spiral configuration of said spring in position to engage the lateral surfaces of said spring between its lateral margins at selected points along its spiral length upon deflection thereof in response to variations in fluid pressure, said abutment members being axially adjustable along said axis toward and away from the lateral surfaces of said spring to vary the spring deflection required for such engagement.

References Cited in the file of this patent

UNITED STATES PATENTS

| | | |
|---|---|---|
| 837,557 | Gehre | Dec. 4, 1906 |
| 958,172 | Puffenberger | May 17, 1910 |
| 1,310,648 | Clift | July 22, 1919 |
| 2,079,069 | Johnson | May 4, 1937 |
| 2,160,266 | Grisdale | May 30, 1939 |
| 2,424,511 | Stanley et al. | July 22, 1947 |

FOREIGN PATENTS

| | | |
|---|---|---|
| 147,866 | Germany | Feb. 6, 1904 |